United States Patent
Abe et al.

(10) Patent No.: US 8,124,273 B2
(45) Date of Patent: Feb. 28, 2012

(54) NONAQUEOUS ELECTROLYTE SOLUTION AND LITHIUM SECONDARY BATTERY USING SAME

(75) Inventors: Koji Abe, Ube (JP); Kazuhiro Miyoshi, Ube (JP); Masahide Kondo, Ube (JP); Manabu Takase, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 1043 days.

(21) Appl. No.: 12/064,337

(22) PCT Filed: Aug. 11, 2006

(86) PCT No.: PCT/JP2006/315961
§ 371 (c)(1),
(2), (4) Date: Feb. 21, 2008

(87) PCT Pub. No.: WO2007/023700
PCT Pub. Date: Mar. 1, 2007

(65) Prior Publication Data
US 2009/0280404 A1    Nov. 12, 2009

(30) Foreign Application Priority Data
Aug. 22, 2005    (JP) .................................. 2005-239360

(51) Int. Cl.
*H01M 4/36* (2006.01)
(52) U.S. Cl. ........ 429/200; 429/199; 429/188; 429/344; 252/62.2
(58) Field of Classification Search .................. 429/200, 429/199, 188, 344; 252/62.2
See application file for complete search history.

(56) References Cited

U.S. PATENT DOCUMENTS 6,872,493 B2 * 3/2005 Yamada et al. ............... 429/317

FOREIGN PATENT DOCUMENTS

| JP | 2 037668 | 2/1990 |
| JP | 2000 294274 | 10/2000 |
| JP | 2001 57237 | 2/2001 |
| JP | 2003 173816 | 6/2003 |
| JP | 2003 323915 | 11/2003 |
| JP | 2006 107815 | 4/2006 |

* cited by examiner

*Primary Examiner* — Laura Weiner
(74) *Attorney, Agent, or Firm* — Oblon, Spivak, McClelland, Maier & Neustadt, L.L.P.

(57) ABSTRACT

The present invention provides a nonaqueous electrolytic solution exhibiting excellent electrical capacity, long-term cycle property, and storage property in a charged state; and a lithium secondary battery using the nonaqueous electrolytic solution.

The nonaqueous electrolytic solution in which an electrolyte salt is dissolved in a nonaqueous solvent, comprises 0.001% to 5% by weight of a tin compound represented by the following general formula (I) and/or (II), on the basis of the weight of the nonaqueous electrolytic solution:

$$R^1R^2R^3Sn\text{-}MR^4R^5R^6 \quad (I)$$

where $R^1$ to $R^3$ each represent a hydrogen atom, a halogen atom, an alkyl group, an alkenyl group, an alkynyl group, an aryl group, or an aryloxy group; $R^4$ to $R^6$ each represent a hydrogen atom, a halogen atom, an alkyl group, an alkenyl group, an alkynyl group, or an aryl group; M represents Si or Ge; and $$SnX_2 \quad (II)$$

where X represents β-diketonate.

9 Claims, No Drawings

NONAQUEOUS ELECTROLYTE SOLUTION AND LITHIUM SECONDARY BATTERY USING SAME

TECHNICAL FIELD

The present invention relates to a nonaqueous electrolytic solution that can produce a lithium secondary battery exhibiting excellent long-term cycle property and storage property in a charged state, and to a lithium secondary battery using the nonaqueous electrolytic solution.

BACKGROUND ART

In recent years, lithium secondary batteries have been widely used as driving power supplies for small electronic devices and the like. Such lithium secondary batteries are mainly constituted of a positive electrode comprised of a lithium compound oxide, a negative electrode comprised of a carbon material or a lithium metal, and a nonaqueous electrolytic solution. As the nonaqueous electrolytic solution, carbonates such as ethylene carbonate (EC) and propylene carbonate (PC) are used.

A lithium secondary battery using, for example, $LiCoO_2$, $LiMn_2O_4$ or $LiNiO_2$ as a positive electrode material brings about a reduction of the battery performance, because the decomposition products inhibit the desired electrochemical reaction of the battery when part of the solvent of the nonaqueous electrolytic solution locally undergoes an oxidative decomposition during the charging. Such a reduction is considered to be attributed to an electrochemical oxidation of the solvent at the interface between the positive electrode material and the nonaqueous electrolytic solution.

Also, a lithium secondary battery using, for example, a highly crystallized carbon material, such as natural graphite or artificial graphite, as a negative electrode material brings about a reduction of the battery performance, when the solvent of the nonaqueous electrolytic solution undergoes a reductive decomposition on the surface of the negative electrode during the charging. Even in the case of EC, which is widely used as a solvent for the nonaqueous electrolytic solution, it partly undergoes reductive decomposition during repeated charging and discharging cycles, resulting in reduction of the battery performance.

Nonaqueous electrolytic solutions for improving the battery characteristics of such lithium secondary batteries are known, for example, in Patent Documents 1 to 3.

Patent Document 1 discloses a battery using a nonaqueous electrolytic solution in which trifluoromethanesulfonate salts such as $Sn(CF_3SO_3)_2$ are dissolved to improve discharge property after the storage at high temperatures. However, this document does not describe problems of cycle property. Besides, the nonaqueous electrolytic solution in which $Sn(CF_3SO_3)_2$ is dissolved is found to have a problem of unstable quality, for example due to deposits formed in the electrolytic solution during preservation for prolonged periods.

Patent Document 2 discloses a nonaqueous electrolytic solution containing a specific tin salt. This document describes, for example, a battery using an electrolytic solution containing $Sn(CF_3SO_3)_2$, which exhibits improved charge and discharge efficiency at the initial stage, but does not describe a detailed mechanism regarding improvements in cycle property and storage property.

Patent Document 3 discloses a nonaqueous electrolytic solution containing a specific organotin compound or a specific organogermanium compound. This document describes, for example, an electrolytic solution containing dibutyltin (1-allyloxymethyl)ethylene glycolate or dibutyltin bis(acetylacetonate) exhibiting improved cycle property after charging and discharging cycles at a charged voltage of 4.1 V. Unfortunately, electrolytic solutions containing these organotin compounds do not significantly improve cycle property at charging and discharging cycles up to 4.2 V, and lead to a significant reduction in electrical capacity during storage in the charged state of 4.2 V.

As described above, a nonaqueous electrolytic solution containing a conventional organotin compound can improve battery characteristics to some extent but is still far from satisfaction. Nonaqueous electrolytic solutions and lithium secondary batteries with further improved long-term cycle property and storage property are needed.

[Patent Document 1] Japanese Unexamined Patent Application Publication No. 2-37668

[Patent Document 2] Japanese Unexamined Patent Application Publication No. 2000-294274

[Patent Document 3] Japanese Unexamined Patent Application Publication No. 2003-173816

DISCLOSURE OF THE INVENTION

It is an object of the present invention to provide a nonaqueous electrolytic solution having excellent long-term cycle property and storage property in a charged state, and to provide a lithium secondary battery using the nonaqueous electrolytic solution.

The inventors have found that a nonaqueous electrolytic solution containing a tin compound having a specific structure can exhibit high capacity, long-term cycle property, and storage property in a charged state, and have accomplished the present invention.

Thus, the present invention provides the following aspects (1) and (3):

(1) A nonaqueous electrolytic solution in which an electrolyte salt is dissolved in a nonaqueous solvent, comprising 0.001% to 5% by weight of a tin compound represented by the following general formula (I) and/or (II), on the basis of the weight of the nonaqueous electrolytic solution:

$$R^1R^2R^3Sn\text{-}MR^4R^5R^6 \tag{I}$$

where $R^1$, $R^2$, and $R^3$ each represent a hydrogen atom, a halogen atom, a C1 to C12 alkyl group, a C2 to C12 alkenyl group, a C2 to C12 alkynyl group, a C6 to C18 aryl group, or a C6 to C18 aryloxy group that may be substituted; $R^4$, $R^5$, and $R^6$ each represent a hydrogen atom, a halogen atom, a C1 to C12 alkyl group, a C2 to C12 alkenyl group, a C2 to C12 alkynyl group, or a C6 to C18 aryl group; M represents Si or Ge; and $R^1$ to $R^3$ and $R^4$ to $R^6$ may be the same or different from each other; and $$SnX_2 \tag{II}$$

where X represents β-diketonate.

(2) The nonaqueous electrolytic solution according to aspect (1), further comprising 0.001% to 5% by weight of a tin compound represented by the following general formula (III), on the basis of the weight of the nonaqueous electrolytic solution:

$$SnR^7R^8R^9R^{10} \tag{III}$$

where $R^7$ represents a hydrogen atom, a C1 to C12 alkyl group, a C2 to C12 alkenyl group, a C2 to C12 alkynyl group, a C6 to C18 aryl group, or a C6 to C18 aryloxy group; $R^8$, $R^9$, and $R^{10}$ each represent a C1 to C12 alkyl group, a C2 to C12 alkenyl group, a C2 to C12 alkynyl group, a C6 to C18 aryl group, or a C6 to C18 aryloxy group; and $R^8$ to $R^{10}$ may be the same or different from each other.

(3) A lithium secondary battery comprising a positive electrode, a negative electrode, and a nonaqueous electrolytic solution in which an electrolyte salt is dissolved in a nonaqueous solvent, wherein the nonaqueous electrolytic solution is the nonaqueous electrolytic solution of aspect (1) or (2).

The lithium secondary battery using the nonaqueous electrolytic solution of the present invention can exhibit excellent electrical capacity, long-term cycle property, and storage property in a charged state.

DETAILED DESCRIPTION OF THE INVENTION

The nonaqueous electrolytic solution of the present invention for lithium secondary batteries using a nonaqueous electrolytic solution in which an electrolyte salt is dissolved in a nonaqueous solvent, contains 0.001% to 5% by weight of a tin compound represented by the following general formula (I) and/or (II), on the basis of the weight of the nonaqueous electrolytic solution. The electrolyte solution containing such a tin compound exhibits excellent ionic conductivity to the film coated on the surface of the positive and/or negative electrodes, thereby inhibiting the decomposition of the solvent. As a result, secondary batteries using this electrolytic solution can exhibit excellent high capacity, long-term cycle property, and storage property in a charged state.

One of the tin compounds used in the present invention is represented by the following general formula (I):

$$R^1R^2R^3Sn\text{-}MR^4R^5R^6 \qquad (I)$$

where $R^1$, $R^2$, and $R^3$ each represent a hydrogen atom, a halogen atom, a C1 to C12 alkyl group, a C2 to C12 alkenyl group, a C2 to C12 alkynyl group, a C6 to C18 aryl group, or a C6 to C18 aryloxy group that may be substituted; $R^4$, $R^5$, and $R^6$ each represent a hydrogen atom, a halogen atom, a C1 to C12 alkyl group, a C2 to C12 alkenyl group, a C2 to C12 alkynyl group, or a C6 to C18 aryl group; M represents Si or Ge; and $R^1$ to $R^3$ and $R^4$ to $R^6$ may be the same or different from each other.

Specific examples of the tin compounds represented by the general formula (I) in the case where M represents Si include trimethyl(trimethylsilyl)tin
[$R^1$=$R^2$=$R^3$=$R^4$=$R^5$=$R^6$=methyl group], trimethyl(triethylsilyl)tin [$R^1$=$R^2$=$R^3$=methyl group, $R^4$=$R^5$=$R^6$=ethyl group], trimethyl(tripropylsilyl)tin [$R^1$=$R^2$=$R^3$=methyl group, $R^4$=$R^5$=$R^6$=propyl group], trimethyl(tributylsilyl)tin [$R^1$=$R^2$=$R^3$=methyl group, $R^4$=$R^5$=$R^6$=butyl group], triethyl(trimethylsilyl)tin [$R^1$=$R^2$=$R^3$=ethyl group, $R^4$=$R^5$=$R^6$=methyl group], tripropyl(trimethylsilyl)tin [$R^1$=$R^2$=$R^3$=propyl group, $R^4$=$R^5$=$R^6$=methyl group], tributyl(trimethylsilyl)tin [$R$=$R^2$=$R^3$=butyl group, $R^4$=$R$=$R$=methyl group], trimethyl(dimethylphenylsilyl)tin [$R^1$=$R^2$=$R^3$=methyl group, $R^4$=$R^5$=methyl group, $R^6$=phenyl group], trimethyl(methyldiphenylsilyl)tin [$R^1$=$R^2$=$R^3$=methyl group, $R^4$=methyl group, $R^5$=$R^6$=phenyl group], trimethyl(dimethylethynylsilyl)tin [$R^1$=$R^2$=$R^3$=methyl group, $R^4$=$R^5$=methyl group, $R^6$=ethynyl group], triphenyl(dimethylethynylsilyl)tin [$R^1$=$R^2$=$R^3$=phenyl group, $R^4$=$R^5$=methyl group, $R^6$=ethynyl group], chlorodimethyl(dimethylethynylsilyl)tin [$R^1$=$R^2$=methyl group, $R^3$=chlorine atom, $R^4$=$R^5$=methyl group, $R^6$=ethynyl group], triphenyl(tert-butyldimethylsilyl)tin [$R^1$=$R^2$=$R^3$=phenyl group, $R^4$=$R^5$=methyl group, $R^6$=tert-butyl group], triphenyl(octyldimethylsilyl)tin [$R^1$=$R^2$=$R^3$=phenyl group, $R^4$=$R^5$=methyl group, $R^6$=octyl group], triphenyl(dimethylethynylsilyl)tin [$R^1$=$R^2$=$R^3$=phenyl group, $R^4$=$R^5$=methyl group, $R^6$=ethynyl group], chlorodimethyl(dimethylethynylsilyl)tin [$R^1$=$R^2$=methyl group, $R^3$=chlorine atom, $R^4$=$R^5$=methyl group, $R^6$=ethynyl group], fluorodimethyl(dimethylethynylsilyl)tin [$R^1$=$R^2$=methyl group, $R^3$=fluorine atom, $R^4$=$R^5$=methyl group, $R^6$=ethynyl group], triphenyl(3-chloropropyldimethylsilyl)tin [$R^1$=$R^2$=$R^3$=phenyl group, $R^4$=$R^5$=methyl group, $R^6$=3-chloropropyl group], trimethyl(3-bromopropyldiphenylsilyl)tin [$R^1$=$R^2$=$R^3$=methyl group, $R^4$=$R^5$=phenyl group, $R^6$=3-bromopropyl group], trimethyl(2-bromophenoxydiphenylsilyl)tin [$R^1$=$R^2$=$R^3$=methyl group, $R^4$=$R^5$=phenyl group, $R^6$=2-bromophenoxy group], methyldiphenyl(dimethylsilyl)tin [$R^1$=methyl, $R^2$=$R^3$=phenyl group, $R^4$=$R^5$=methyl group, $R^6$=hydrogen atom], and tributyl(methyldiphenylsilyl)tin [$R^1$=$R^2$=$R^3$=butyl group, $R^4$=methyl group, $R^5$=$R^6$=phenyl group].

Among these preferred is at least one compound selected from the group consisting of tributyl(trimethylsilyl)tin, tributyl(triethylsilyl)tin, tributyl(tripropylsilyl)tin, tributyl(tributylsilyl)tin, triphenyl(trimethylsilyl)tin, triphenyl(dimethylallylsilyl)tin, triphenyl(dimethylphenylsilyl)tin, triphenyl(tert-butyldimethylsilyl)tin, triphenyl(dimethylethynylsilyl)tin, and chlorodimethyl(dimethylethynylsilyl)tin, from the viewpoint of improvements in long-term cycle property and storage property in a charged state.

Among these particularly preferred is at least one compound selected from the group consisting of tributyl(trimethylsilyl)tin, triphenyl(dimethylallylsilyl)tin, and triphenyl(dimethylphenylsilyl)tin.

Specific examples of the tin compounds represented by the general formula (I) in the case where M represents Ge include stannylgermane [$R^1$=$R^2$=$R^3$=$R^4$=$R^5$=$R^6$=hydrogen atom], trichloro(trichlorostannyl)germane [$R^1$=$R^2$=$R^3$=$R^4$=$R^5$=$R^6$=chlorine atom], trifluoro(trifluorostannyl)germane [$R^1$=$R^2$=$R^3$=$R^4$=$R^5$=$R^6$=fluorine atom], trimethyl(stannyl)germane [$R^1$=$R^2$=$R^3$=hydrogen atom, $R^4$=$R^5$=$R^6$=methyl group], trimethyl stannyl germane [$R^1$=$R^2$=$R^3$=methyl group, $R^4$=$R^5$=$R^6$=hydrogen atom], trimethyl(trimethylstannyl)germane [$R^1$=$R^2$=$R^3$=$R^4$=$R^5$=$R^6$=methyl group], chlorodimethyl(trimethylstannyl)germane [$R^1$=$R^2$=$R^3$=methyl group, $R^4$=$R^5$=methyl group, $R^6$=chlorine atom], fluorodimethyl(trimethylstannyl)germane [$R^1$=$R^2$=$R^3$=methyl group, $R^4$=$R^5$=methyl group, $R^6$=fluorine atom], chlorodimethyl(chlorodimethylstannyl)germane [$R^1$=$R^2$=methyl group, $R^3$=chlorine atom, $R^4$=$R^5$=methyl group, R=chlorine atom], fluorodimethyl(fluorodimethylstannyl)germane [$R^1$=$R^2$=methyl group, $R^3$=fluorine atom, $R^4$=$R^5$=methyl group, $R^6$=fluorine atom], triethyl(trimethylstannyl)germane [$R^1$=$R^2$=$R^3$=methyl group, $R^4$=$R^5$=$R^6$=ethyl group], chlorobis(1-methylethyl)(trimethylstannyl)germane [$R^1$=$R^2$=$R^3$=methyl group, $R^4$=$R^5$=i-propyl group, $R^6$=chlorine atom], fluorobis(1-methylethyl)(trimethylstannyl)germane [$R^1$=$R^2$=$R^3$=methyl group, $R^4$=$R^5$=i-propyl group, $R^6$=fluorine atom], (dimethylphenylstannyl)methylphenyl-1-naphthalenylgermane [$R^1$=$R^2$=methyl group, $R^3$=phenyl group, $R^4$=methyl group, $R^5$=phenyl group, $R^6$=1-naphthalenyl group], triphenyl(trimethylstannyl)germane [$R^1$=$R^2$=$R^3$=methyl group, $R^4$=$R^5$=$R^6$=phenyl group], [methyl(1-methylethyl)phenylstannyl]triphenylgermane [$R^1$=methyl group, $R^2$=i-propyl group, $R^3$=$R^4$=$R^5$=$R^6$=phenyl group], [methyl(2-methyl-2-phenylpropyl)phenylstannyl]triphenylgermane [$R^1$=methyl group, $R^2$=phenyl-2,2-dimethylethyl, $R^3$=$R^4$=$R^5$=$R^6$=phenyl group], triethyl(triethylstannyl)

germane [R¹═R²═R³═R⁴═R⁵═R⁶=ethyl group], triphenyl(triethylstannyl)germane [R¹═R²═R³=ethyl group, R⁴═R⁵═R⁶=phenyl group], (diethylphenoxystannyl)triphenylgermane [R¹═R²=ethyl group, R³=phenoxy group, R⁴═R⁵═R⁶=phenyl group], trimethyl(tripropylstannyl)germane [R¹═R²═R³=propyl group, R⁴═R⁵═R⁶=methyl group], trimethyl(tributylstannyl)germane [R¹═R²═R³=butyl group, R⁴═R⁵═R⁶=methyl group], triethyl(tributylstannyl)germane [R¹═R²═R³=butyl group, R⁴═R⁵═R⁶=ethyl group], tributyl(tributylstannyl)germane [R¹═R²═R³═R⁴═R⁵═R⁶=butyl group], chloro[chlorobis(1,1-dimethylethyl)stannyl]dimethylgermane [R¹═R²=methyl group, R³=chlorine atom, R⁴═R⁵=tert-butyl group, R⁶=chlorine atom], fluoro[fluorobis(1,1-dimethylethyl)stannyl]dimethylgermane [R¹═R²=methyl group, R³=fluorine atom, R⁴═R⁵=tert-butyl, R⁶=fluorine atom], triphenyl(tributylstannyl)germane [R¹═R²═R³=butyl group, R⁴═R⁵═R⁶=phenyl group], triethyl[tris(2,2-dimethylpropyl)stannyl]germane [R¹═R²═R³=2,2-dimethylpropyl group, R⁴═R⁵═R⁶=ethyl group], trimethyl(triphenylstannyl)germane [R¹═R²═R³=phenyl group, R⁴═R⁵═R⁶=methyl group], triethyl(triphenylstannyl)germane [R¹═R²═R³=phenyl group, R⁴═R⁵═R⁶=ethyl group], triphenyl(triphenylstannyl)germane [R¹═R²═R³═R⁴═R⁵═R⁶=phenyl group], [ethylbis(phenylethynyl)stannyl]triphenylgermane [R¹=ethyl group, R²═R³=phenylethynyl group, R⁴═R⁵═R⁶=phenyl group], [diethyl(phenylethynyl)stannyl]triphenylgermane [R¹═R²=ethyl group, R³=phenylethynyl group, R⁴═R⁵═R⁶=phenyl group], [diphenyl(phenylethynyl)stannyl]triphenylgermane [R¹═R²=phenyl group, R³=phenylethynyl group, R⁴═R⁵═R⁶=phenyl group], bis(pentafluorophenyl)(triethylstannyl)germane [R¹═R²=pentafluorophenyl group, R³=hydrogen atom, R⁴═R⁵═R⁶=ethyl group], tris(pentafluorophenyl)(triethylstannyl)germane [R¹═R²═R³=pentafluorophenyl group, R⁴═R⁵═R⁶=ethyl group], trimethyl[tris(difluoromethyl)stannyl]germane [R¹═R²═R³=difluoromethyl group, R⁴═R⁵═R⁶=methyl group], trimethyl [bis(difluromethyl)(trifluromethyl)stannyl]germane [R¹═R²=difluoromethyl group, R³=trifluoromethyl group, R⁴═R⁵═R⁶=methyl group], trimethyl[(difluoromethyl)bis(trifluoromethyl)stannyl]germane [R¹=difluoromethyl group, R²═R³=trifluoromethyl group, R⁴═R⁵═R⁶=methyl group], trimethyl[tris(trifluoromethyl)stannyl]germane [R¹═R²═R³=trifluoromethyl group, R⁴═R⁵═R⁶=methyl group], tris(pentafluorophenyl)[tris(pentafluorophenyl)stannyl]germane [R¹═R²═R³═R⁴═R⁵═R⁶=pentafluorophenyl group], [methoxybis[2,4,6-tris(1-methylethyl)phenyl]stannyl]bis(2,4,6-trimethylphenyl)germane [R¹=methoxy group, R²═R³=2,4,6-tris(1-methylethyl)phenyl group, R⁴=hydrogen atom, R⁵═R⁶=2,4,6-tris(1-methylethyl)phenyl group], and [fluorobis[2,4,6-tris(1-methylethyl)phenyl]stannyl]methylbis(2,4,6-trimethylphenyl)germane [R¹=fluorine atom, R²═R³=2,4,6-tris(1-methylethyl)phenyl group, R⁴=methyl group, R⁵═R⁶=2,4,6-tris(1-methylethyl)phenyl group].

Among these preferred is at least one compound selected from the group consisting of trimethyl(trimethylstannyl)germane, triethyl(trimethylstannyl)germane, trimethyl(triethylstannyl)germane, triethyl(triethylstannyl)germane, trimethyl(tripropylstannyl)germane, trimethyl(tributylstannyl)germane, triethyl(tributylstannyl)germane, tributyl(tributylstannyl)germane, trimethyl[tris(difluoromethyl)stannyl]germane, trimethyl[bis(difluoromethyl)(trifluoromethyl)stannyl]germane, trimethyl [(difluoromethyl)bis(trifluoromethyl)stannyl]germane, and trimethyl[tris(trifluoromethyl)stannyl]germane, from the viewpoint of improvements in long-term cycle property and storage property in a charged state.

Among these particularly preferred is at least one compound selected from the group consisting of trimethyl(tributylstannyl)germane and triethyl(tributylstannyl)germane.

The other of the tin compounds used in the present invention is represented by the following general formula (II):

SnX₂                                    (II)

where X represents β-diketonate.

Specific examples of the tin compounds represented by the general formula (II) include bis(acetylacetonate)tin, bis(hexafluoroacetylacetonate)tin, bis(2,2,6,6-tetramethyl-3,5-heptanedionate)tin, bis(2,2-dimethyl-3,5-hexanedionate)tin, bis(benzoylacetonate)tin, bis(methylacetylacetate)tin, bis(ethylacetylacetate)tin, bis(propylacetylacetate)tin, and bis(butylacetylacetate)tin.

Among these preferred is at least one compound selected from the group consisting of bis(acetylacetonate)tin, bis(hexafluoroacetylacetonate)tin, from the viewpoint of improvements in long-term cycle property and storage property in a charged state.

Preferably, the nonaqueous electrolytic solution further comprises a tin compound represented by the following general formula (III):

SnR⁷R⁸R⁹R¹⁰                             (III)

where R⁷ represents a hydrogen atom, a C1 to C12 alkyl group, a C2 to C12 alkenyl group, a C2 to C12 alkynyl group, a C6 to C18 aryl group, or a C6 to C18 aryloxy group; R⁸, R⁹, and R¹⁰ each represent a C1 to C12 alkyl group, a C2 to C12 alkenyl group, a C2 to C12 alkynyl group, a C6 to C18 aryl group, or a C6 to C18 aryloxy group; and R⁸ to R¹⁰ may be the same or different from each other.

Specific examples of the tin compounds represented by the general formula (III) include tetramethyltin [R⁷═R⁸═R⁹═R¹⁰=methyl group], tetraethyltin [R⁷═R⁸═R⁹═R¹⁰=ethyl group], tetrapropyltin [R⁷═R⁸═R⁹═R¹⁰=propyl group], tetrabutyltin [R⁷═R⁸═R⁹═R¹⁰=butyl group], tetrapentyltin [R⁷═R⁸═R⁹═R¹⁰=pentyl group], trimethylallyltin [R⁷═R⁸═R⁹=methyl group, R¹⁰=allyl group], tributylallyltin [R⁷═R⁸═R⁹=butyl group, R¹⁰=allyl group], tributylethynyltin [R⁷═R⁸═R⁹=butyl group, R¹⁰=ethynyl group], dibutyldivinyltin [R⁷═R⁸=butyl group, R⁹═R¹⁰=vinyl group], phenylethynyltrimethyltin [R⁷═R⁸═R⁹=methyl group, R¹⁰=phenylethynyl group], phenylethynyltributyltin [R⁷═R⁸═R⁹=butyl group, R¹⁰=phenylethynyl group], triphenylallyltin [R⁷═R⁸═R⁹=phenyl group, R¹⁰=allyl group], dibutylbis(phenoxy)tin [R⁷═R⁸=butyl group, R⁹═R¹⁰=phenyloxy group], tributylphenoxytin [R⁷═R⁸═R⁹=butyl group, R¹⁰=phenyloxy group], dibutylbis(pentafluorophenoxy)tin [R⁷═R⁸=butyl, R⁹═R¹⁰=pentafluorophenyloxy group], and tributylpentafluorophenoxytin [R⁷═R⁸═R⁹=butyl group, R¹⁰=pentafluorophenyloxy group].

Among the tin compounds represented by the general formula (III) preferred is at least one compound selected from the group consisting of tetrabutyltin, trimethylallyltin, tributylallyltin, tributylethynyltin, dibutyldivinyltin, triphenylallyltin, and tributylpentafluorophenoxytin, from the viewpoint of improvements in long-term cycle property and storage property in a charged state.

In the present invention, an excessively large content of the tin compound in the nonaqueous electrolytic solution may impair battery characteristics, whereas a significantly small content of the tin compound in the nonaqueous electrolytic solution may not enhance the effect of improvements in long-term cycle property and storage property in a charged state.

Therefore, the content of the tin compound represented by the general formula (I) or (III) is preferably 0.001% by weight or more, more preferably 0.1% by weight or more, and most preferably 0.2% by weight or more, on the basis of the weight of the nonaqueous electrolytic solution. Also, the content of the tin compound represented by the general formula (I) or (III) is preferably 5% by weight or lower, more preferably 1% by weight or lower, and most preferably 0.5% by weight or lower, on the basis of the weight of the nonaqueous electrolytic solution.

The content of the tin compound represented by the general formula (II) is preferably 0.001% by weight or more, more preferably 0.02% by weight or more, and most preferably 0.05% by weight or more, on the basis of the weight of the nonaqueous electrolytic solution. Also, the content of the tin compound represented by the general formula (II) is preferably 5% by weight or lower, more preferably 0.5% by weight or lower, and most preferably 0.2% by weight or lower, on the basis of the weight of the nonaqueous electrolytic solution.

In the case of a mixture of a tin compound represented by the general formula (II) and a tin compound represented by the general formula (I) or (III), it is preferred that the content of the tin compound represented by the general formula (II) is lower than that of the tin compound represented by the general formula (I) or (III). This is because a surface film of the tin compound represented by the general formula (II) is more rapidly formed on a negative electrode than that of the tin compound represented by the general formula (I) or (III). Thus, a larger amount of the tin compound represented by the general formula (II) than the tin compound represented by the general formula (I) or (III) may offset the effect of mixing.

Examples of nonaqueous solvents used in the present invention include cyclic carbonates, linear carbonates, sulfur acid ester compounds, esters, ethers, amides, phosphate esters, sulfones, lactones, and nitriles.

Examples of the cyclic carbonates include ethylene carbonate (EC), propylene carbonate (PC), butylene carbonate, fluoroethylene carbonate, and vinylethylene carbonate. In particular, EC, which has a high dielectric constant, is most preferred.

Examples of the linear carbonates include asymmetric carbonates such as methyl ethyl carbonate (MEC), methyl propyl carbonate, methyl butyl carbonate, and ethyl propyl carbonate; and symmetric carbonates such as dimethyl carbonate (DMC), diethyl carbonate (DEC), and dipropyl carbonate. In particular, DEC, which exhibits excellent storage property in a charged state and cycle property at high temperatures, is most preferred.

Examples of the sulfur acid ester compounds include 1,3-propane sultone (PS), 1,4-butanediol dimethanesulfonate, glycol sulfite, propylene sulfite, glycol sulfate, and propylene sulfate.

Examples of the esters include methyl propionate, methyl pivalate, butyl pivalate, hexyl pivalate, octyl pivalate, dimethyl oxalate, ethyl methyl oxalate, and diethyl oxalate. Examples of the ethers include tetrahydrofuran, 2-methyltetrahydrofuran, 1,4-dioxane, 1,2-dimethoxyethane, 1,2-diethoxyethane, and 1,2-dibutoxyethane. Examples of the amides include dimethylformamide. Examples of the phosphate esters include trimethyl phosphate and trioctyl phosphate. Examples of the sulfones include divinylsulfone. Examples of the lactones include γ-butyrolactone, γ-valerolactone, and α-angelicalactone. Examples of the nitrites include acetonitrile and adiponitrile.

Among these nonaqueous solvents preferred are cyclic carbonates, linear carbonates, esters, and sulfur acid ester compounds. These compounds may be used alone or in combination. More preferably, the nonaqueous solvent contains a cyclic carbonate and/or a linear carbonate.

In particular, combinations of cyclic carbonates, such as EC and PC, and linear carbonates, such as MEC and DEC, are most preferred.

The volume ratio of the cyclic carbonate to the linear carbonate ranges from 10:90 to 40:60, more preferably from 20:80 to 40:60, and most preferably from 25:75 to 45:55.

A combined use of a cyclic carbonate and a linear carbonate with vinylene carbonate (VC) and/or a sulfur acid ester compound is preferred in order to improve storage property in a charged state. Preferred sulfur acid ester compounds are at least one compound selected from the group consisting of 1,3-propane sultone (PS), glycol sulfite, 1,4-butanediol dimethanesulfonate. Particularly preferred is 1,3-propane sultone (PS).

The content of vinylene carbonate and/or the sulfur acid ester compound desirably ranges from 0.01% to 10% by volume, preferably from 0.02% to 9% by volume, more preferably from 0.03% to 8% by volume, and most preferably from 0.05% to 5% by volume, on the basis of the content of the nonaqueous solvent.

Examples of electrolyte salts used in the present invention include lithium salts such as $LiPF_6$, $LiBF_4$, and $LiClO_4$; alkyl-containing lithium salts such as $LiN(SO_2CF_3)_2$, $LiN(SO_2C_2F_5)_2$, $LiC(SO_2CF_3)_3$, $LiPF_4$ $(CF_3)_2$, $LiPF_3$ $(C_2F_5)_3$, $LiPF_3$ $(CF_3)_3$, $LiPF_3(iso-C_3F_7)_3$, and $LiPF_5(iso-C_3F_7)$; and cycloalkylene-containing lithium salts such as $(CF_2)_2(SO_2)_2NLi$ and $(CF_2)_3(SO_2)_2NLi$. Among these particularly preferred electrolyte salts are $LiPF_6$, $LiBF_4$, and $LiN(SO_2CF_3)_2$. The most preferred electrolyte salt is $LiPF_6$. These electrolyte salts may be used alone or in combination.

Examples of preferred combinations of these electrolyte salts include a combination of $LiPF_6$ and $LiBF_4$, a combination of $LiPF_6$ and $LiN(SO_2CF_3)_2$, and a combination of $LiBF_4$ and $LiN(SO_2CF_3)_2$. Particularly preferred is a combination of $LiPF_6$ and $LiBF_4$.

The electrolyte salts can be mixed at any ratio. In the case of a combined use of any other electrolyte salt with $LiPF_6$, a proportion (molar ratio) of the other electrolyte salt desirably ranges from 0.01% to 45%, preferably from 0.03% to 20%, more preferably from 0.05% to 10%, and most preferably from 0.05% to 5%.

The concentration of the total amount of these electrolyte salts generally ranges from 0.1 to 3 M, preferably from 0.5 to 2.5 M, more preferably from 0.7 to 2.0 M, and most preferably from 0.8 to 1.4 M, on the basis of the amount of the nonaqueous solvent.

Examples of preferred combinations of the nonaqueous solvents and the electrolyte salts include solutions containing a mixed solvent of EC and/or PC and MEC and/or DEC in which $LiPF_6$ and/or $LiBF_4$ is dissolved as an electrolyte salt.

The nonaqueous electrolytic solution of the present invention may be prepared, for example, by mixing nonaqueous solvents such as EC, PC, MEC, DEC, VC, and PS, dissolving an electrolyte salt therein, and further dissolving a tin compound represented by the general formula (I) and/or (II) and a tin compound represented by the general formula (III).

It is preferred that the nonaqueous solvents, the tin compounds represented by the general formulae (I) to (III), and other additives used are preliminarily purified to reduce impurities as much as possible within the scope not causing significant decrease of productivity.

Incorporation of, for example, air or carbon dioxide in the nonaqueous electrolytic solution of the present invention can prevent gas generation due to decomposition of the electrolytic solution and can improve battery characteristics such as long-term cycle property and storage property in a charged state.

In the present invention, methods for incorporating (dissolving) air or carbon dioxide in the nonaqueous electrolytic solution include (1) bringing the nonaqueous electrolytic solution into contact with air or carbon dioxide-containing gas before the solution is fed into a battery; or (2) feeding the solution into a battery and then incorporating air or carbon dioxide-containing gas in the solution before or after the battery is sealed. It is preferred that the air or carbon dioxide-containing gas contain moisture as little as possible and have a dew point of $-40°$ C. or below, and more preferably $-50°$ C. or below.

In the present invention, use of a nonaqueous electrolytic solution containing dissolved carbon dioxide is particularly preferred in order to improve storage property in a charged state at high temperatures. The amount of dissolved carbon dioxide is desirably 0.001% by weight or more, preferably 0.05% by weight or more, and more preferably 0.2% by weight or more. A nonaqueous electrolytic solution containing saturated carbon dioxide is most preferred.

The nonaqueous electrolytic solution of the present invention may further contain an aromatic compound to enhance the safety of overcharged batteries.

Examples of such aromatic compounds include the following groups (a) to (c):

(a) Cyclohexylbenzene, fluorocyclohexylbenzene compounds (1-fluoro-2-cyclohexylbenzene, 1-fluoro-3-cyclohexylbenzene, and 1-fluoro-4-cyclohexylbenzene), and biphenyl;

(b) tert-Butylbenzene, 1-fluoro-4-tert-butylbenzene, tert-amylbenzene, 4-tert-butylbiphenyl, 4-tert-amylbiphenyl, and 1,3-di-tert-butylbenzene;

(c) Terphenyls (o-, m- and p-), diphenyl ether, 2-fluorodiphenyl ether, 4-diphenyl ether, fluorobenzene, difluorobenzenes (o-, m- and p-), 2-fluorobiphenyl, 4-fluorobiphenyl, 2,4-difluoroanisole, and partially hydrogenated terphenyls (1,2-dicyclohexylbenzene, 2-phenylbicyclohexyl, 1,2-diphenylcyclohexane, and o-cyclohexylbiphenyl).

Among these, groups (a) and (b) are preferred. Most preferred is at least one compound selected from the group consisting of cyclohexylbenzene, fluorocyclohexylbenzene compounds (1-fluoro-4-cyclohexylbenzene and the like), tert-butylbenzene, tert-amylbenzene, and 1,3-di-tert-butylbenzene.

A total content of the aromatic compounds preferably ranges from 0.1% to 5% by weight.

The lithium secondary battery of the present invention comprises a positive electrode, a negative electrode, and a nonaqueous electrolytic solution in which an electrolyte salt is dissolved in a nonaqueous solvent. These components, such as a positive electrode and a negative electrode, other than the nonaqueous electrolytic solution can be used without limitation.

For example, usable positive electrode active materials include complex metal oxides of lithium with cobalt, manganese, or nickel. Such positive electrode active materials may be used singly or in combination of two or more thereof.

Examples of such lithium-containing complex metal oxides include $LiCoO_2$, $LiMn_2O_4$, $LiNiO_2$, $LiCO_{1-x}Ni_xO_2$ (0.01<x<1), $LiCO_{1/3}Ni_{1/3}Mn_{1/3}O_2$, and $LiNi_{1/2}Mn_{3/2}O_4$. These oxides may be used in a combination of, for example, $LiCoO_2$ and $LiMn_2O_4$, $LiCoO_2$ and $LiNiO_2$, or $LiMn_2O_4$ and $LiNiO_2$.

An element of the lithium-containing complex oxides may be partly substituted by any other element to improve safety of overcharged batteries, cycle property and to enable the batteries to be used at a charging potential of 4.3 V or higher. For example, part of cobalt, manganese, or nickel may preferably be substituted by at least one element selected from the group consisting of Sn, Mg, Fe, Ti, Al, Zr, Cr, V, Ga, Zn, Cu, Bi, Mo, and La. Part of O may preferably be substituted by S or F. Alternatively, the lithium-containing complex oxides are preferably coated with a compound containing these substituent elements.

Among these preferably used are lithium-containing complex metal oxides, such as $LiCoO_2$, $LiMn_2O_4$, and $LiNiO_2$, which can be used at a charging potential of the positive electrode of 4.3 V or higher with reference to Li in a fully charged state. Lithium-containing complex metal oxides such as $LiCO_{1-x}M_xO_2$ (where M represents at least one element selected from the group consisting of Sn, Mg, Fe, Ti, Al, Zr, Cr, V, Ga, Zn, and Cu and X is $0.001 \leq x \leq 0.05$), $LiCo_{1/3}Ni_{1/3}Mn_{1/3}O_2$ and $LiNi_{1/2}Mn_{3/2}O_4$, which are usable at 4.4 V or higher, are more preferred.

As a positive electrode active material, lithium-containing olivine phosphates may also be used. Specific examples of such phosphates include $LiFePO_4$, $LiCoPO_4$, $LiNiPO_4$, $LiMnPO_4$, $LiFe_{1-x}M_xPO_4$ (where M represents at least one element selected from the group consisting of Co, Ni, Mn, Cu, Zn, and Cd and x is $0 \leq x \leq 0.5$). Among these, $LiFePO_4$ or $LiCoPO_4$ is particularly preferred as a positive electrode active material for high-voltage use.

The lithium-containing olivine phosphate may be used in the form of a mixture with any other positive electrode active material.

The conductive material for the positive electrode may be any electron conductive material which does not undergo a chemical change. Examples of such conductive materials include graphites, for example, natural graphite (flake graphite) and artificial graphite, and carbon blacks, for example, acetylene black, ketjen black, channel black, furnace black, lamp black, and thermal black. The graphites and the carbon blacks may be used as an appropriate mixture. The amount of the conductive material added to a positive electrode mixture preferably ranges from 1% to 10% by weight and particularly preferably from 2% to 5% by weight.

The positive electrode may be prepared by mixing a positive electrode active material, a conductive material such as acetylene black or carbon black, and a binder such as polytetrafluoroethylene, polyvinylidene fluoride, a styrene-butadiene copolymer, an acrylonitrile-butadiene copolymer, carboxymethyl cellulose, and an ethylene-propylene-diene terpolymer, kneading the mixture with a high-boiling point solvent such as 1-methyl-2-pyrrolidone to prepare a positive electrode mixture, then rolling the resulting positive electrode material on a collector such as an aluminum foil or a lath board made of stainless steel, and then heating the resulting assembly at a temperature in the range of 50° C. to 250° C. for about 2 hours under vacuum.

Usable materials for the negative electrode (negative electrode active materials) include lithium metal, lithium alloys, carbon materials that can intercalate and deintercalate lithium (thermally decomposed carbon materials, cokes, graphites (such as artificial graphite and natural graphite), fired organic polymer compounds, and carbon fibers), tin, a tin compound, silicon, and a silicon compound. These materials may be used singly or in combination of two or more thereof.

Among these preferred are carbon materials. More preferred are carbon materials which have a graphite crystal structure having a lattice spacing ($d_{002}$) of the lattice face (002) of 0.340 nm or less and particularly in the range of 0.335 to 0.340 nm. Since low-crystallinity carbon materials that have lower crystallinity than the carbon materials described above can enhance the effect of addition of the tin compounds represented by the general formulae (I) to (III), it is particularly preferred that the surface of the carbon material having a graphite crystal structure is partly or completely coated with this low-crystallinity carbon material. The state of the surface coating with the low-crystallinity carbon material can be detected by the observation of a cross section of the carbon material with a transmission electron microscope.

Tin, a tin compound, silicon, and a silicon compound are also preferred because these compounds can enhance the battery capacity.

The negative electrode may be prepared using the same binder and the same high-boiling-point solvent as in the method of preparing the positive electrode.

The lithium secondary battery can have any structure without restriction. The secondary battery may be a coin-shaped battery, a cylindrical battery, a square-shaped battery, or a laminate-type battery, each having a single layered or multi-layered separator.

The battery separator may be composed of a single layered or multi layered porous film, woven fabric, or non-woven fabric of a polyolefin such as polypropylene or polyethylene.

A separator having a significantly high Gurley value (air permeability) may lead to a reduction in lithium ion conductivity and thus does not sufficiently function as a battery separator, although it depends on fabrication conditions. Therefore, the Gurley value is preferably 1000 seconds/100 cc or lower, more preferably 800 seconds/100 cc or lower, and most preferably 500 seconds/100 cc or lower. A significantly low Gurley value of the battery separator may lead to low mechanical strength. Therefore, the Gurley value is preferably 50 seconds/100 cc or more, more preferably 100 seconds/100 cc or more, and most preferably 300 seconds/100 cc or more. The porosity of the separator preferably ranges from 30% to 60%, more preferably from 35% to 55%, and most preferably from 40% to 50%, from the viewpoint of improvements in capacity characteristics of the battery.

Furthermore, a higher energy density is achieved by a smaller thickness of the separator. Thus, the thickness of the battery separator is preferably 50 µm or less, more preferably 40 µm or less, and most preferably 25 µm or less. Also, in order to ensure sufficient mechanical strength, the thickness of the battery separator is preferably 5 µm or more, more preferably 10 µm or more, and most preferably 15 µm or more.

In the present invention, it is preferable to control the density of the electrode material layer in order to enhance the effect of addition of the tin compounds represented by the general formulae (I) to (III). In particular, the density of the positive electrode mixture layer formed on an aluminum foil preferably ranges from 3.2 to 4.0 g/cm$^3$, more preferably from 3.3 to 3.9 g/cm$^3$, and most preferably from 3.4 to 3.8 g/cm$^3$. The density of the positive electrode mixture layer exceeding 4.0 g/cm$^3$ may not readily prepare the positive electrode mixture layer in some cases. The density of the negative electrode mixture layer formed on a copper foil preferably ranges from 1.3 to 2.0 g/cm$^3$, more preferably from 1.4 to 1.9 g/cm$^3$, and most preferably from 1.5 to 1.8 g/cm$^3$. The density of the negative electrode mixture layer exceeding 2.0 g/cm$^3$ may not readily prepare the negative electrode mixture layer in some cases.

A significantly small thickness of the electrode layer may lead to a reduction in the amount of the active material in the electrode material layer and thus a reduction in the battery capacity. A significantly large thickness of the electrode layer may lead to poor cycle property and rate property. Thus, the thickness of the electrode layer of the positive electrode (for one side of the collector) generally ranges from 30 to 120 µm and preferably from 50 to 100 µm. The thickness of the electrode layer of the negative electrode (for one side of the collector) generally ranges from 1 to 100 µm and preferably from 3 to 70 µm.

The lithium secondary battery of the present invention exhibits excellent long-term cycle property even when the final charging voltage is 4.2 V or higher and particularly 4.3 V or higher. Furthermore, the cycle property are favorable even when the final charging voltage is 4.4 V. The final discharging voltage can be set to 2.5 V or more and preferably 2.8 V or more. Although the current value is not restricted, a constant current discharge of 0.1 C to 3 C is generally employed. The lithium secondary battery of the present invention may be charged and discharged at −40° C. to 100° C. and preferably 0° C. to 80° C.

In the present invention, a sealing plate may be provided with a relief valve, as a countermeasure against an increase in internal pressure of the lithium secondary battery. Alternatively, a cutout may be provided in a battery component such as a battery can or a gasket.

In the lithium secondary battery of the present invention, a plurality of lithium secondary batteries may be accommodated in a battery pack in series and/or in parallel, as necessary. The battery pack can be provided with an overcurrent circuit breaker such as a PTC element, a thermal fuse, or a bimetal, as well as a safety circuit (a circuit that can monitor the voltage, the temperature, and the current of each battery and/or the entire battery pack, and can shut off the current, as necessary).

EXAMPLES

The present invention will now be described in more detail with reference to Examples and Comparative Examples. It should be noted, however, that the present invention is not limited to these Examples.

Example 1

Preparation of Nonaqueous Electrolytic Solution

A nonaqueous mixed solvent having a proportion (volume basis) of ethylene carbonate (EC):vinylene carbonate (VC): diethyl carbonate (DEC) of 29:1:70 was prepared in a dry nitrogen atmosphere. LiPF$_6$ as an electrolyte salt was dissolved in this solvent into a concentration of 1 M to prepare a nonaqueous electrolytic solution. To this nonaqueous electrolytic solution, 0.4% by weight of carbon dioxide was dissolved and tributyl(trimethylsilyl)tin was added into a concentration of 0.1% by weight on the basis of the nonaqueous electrolytic solution. The nonaqueous solvent, the electrolyte salt, and the Sn-containing compound used had been preliminarily purified.

Preparation of Lithium Secondary Battery

Ninety-four % by weight of LiCO$_{1/3}$Ni$_{1/3}$Mn$_{1/3}$O$_2$ (positive electrode active material), 3% by weight of acetylene black (conductive material), and 3% by weight of polyvinylidene fluoride (binder) were mixed. This mixture was mixed with 1-methyl-2-pyrrolidone as a solvent. The resulting mixture was applied onto one side of an aluminum foil, was dried, was compression-molded, was heated, and was punched out to prepare a positive electrode having a diameter of 16 mm.

Aside from this, 95% by weight of artificial graphite (negative electrode active material) which had a graphite crystal structure having a lattice spacing ($d_{002}$) of the lattice face (002) of 0.335 nm was mixed with 5% by weight of polyvinylidene fluoride (binder). The mixture was mixed with 1-methyl-2-pyrrolidone as a solvent. The resulting mixture was applied onto one side of a copper foil, was dried, was compression-molded, was heated, and was punched out to prepare a negative electrode having a diameter of 16 mm.

A coin-shaped battery (diameter: 20 mm, thickness: 3.2 mm) was then fabricated with a microporous polyethylene film separator having a thickness of 20 μm. The nonaqueous electrolytic solution was poured, and then carbon dioxide having a dew point of −60° C. was fed before the battery was sealed. At this time, the positive electrode had an electrode density of 3.4 g/cm$^3$, whereas the negative electrode had an electrode density of 1.6 g/cm$^3$. The electrode layer of the positive electrode had a thickness (for one side of the collector) of 55 μm, whereas the electrode layer of the negative electrode had a thickness (for one side of the collector) of 60 μm.

Measurement of Battery Characteristics (Discharge Capacity Retention after 200 Cycles)

The resulting coin-shaped battery was charged at a constant current of 2 mA and a constant voltage up to a final voltage of 4.2 V at a room temperature (25° C.) for 5 hours. Next, the battery was discharged at a constant current of 2 mA down to a final voltage of 2.7 V. This charge-discharge cycle was repeated 200 times. The discharge capacity at the 200th cycle was measured. The discharge capacity retention after 200 cycles (%) to the initial discharge capacity (100%) was calculated from the following formula:

Discharge capacity retention after 200 cycles (%)= (discharge capacity at 200th cycle)/(discharge capacity at 1st cycle)×100

(Recovery Rate of Discharge Capacity)

Another coin-shaped battery fabricated as above was charged at a constant current of 2 mA and a constant voltage up to a final voltage of 4.2 V at a room temperature (25° C.) for 5 hours. Next, the battery was discharged at a constant current of 2 mA down to a final voltage of 2.7 V. This charge-discharge cycle was repeated 3 times. The discharge capacity at the 3rd cycle was defined as the discharge capacity before the storage. Furthermore, the battery was charged at a constant current of 2 mA and a constant voltage up to a final voltage of 4.2 V at a room temperature (25° C.) for 5 hours and then was stored for 20 days at 60° C. Thereafter, the battery was discharged at a constant current of 2 mA down to a final voltage of 2.7 V at a room temperature (25° C.) and then was charged at a constant current of 2 mA and a constant voltage up to a final voltage of 4.2 V for 5 hours. Next, the battery was discharged at a constant current of 2 mA down to a final voltage of 2.7 V and the recovered discharge capacity after the storage was measured. The recovery rate of the discharge capacity after the storage (%) was calculated as a proportion of the recovered discharge capacity after the storage to the discharge capacity before the storage (discharge capacity at the 3rd cycle).

Recovery Rate of discharge capacity after the storage (%)=[(recovered discharge capacity after the storage)/(discharge capacity before the storage)]× 100

The fabrication conditions and characteristics of the battery are summarized in Table 1.

A nonaqueous mixed solvent having a proportion (volume ratio) of EC:DEC of 3:7 was prepared. LiPF$_6$ as an electrolyte salt was dissolved in this solvent into a concentration of 1 M to prepare a nonaqueous electrolytic solution and 0.1% of Sn(SO$_3$CF$_3$)$_2$ was added to the nonaqueous electrolytic solution. This electrolytic solution resulted in a white precipitate after one-month storage at 25° C. and thus did not have chemical stability as a product. In contrast, no change was observed in the electrolytic solution of Examples 1 even after one-month storage at 25° C.

Examples 2 to 11

Nonaqueous electrolytic solutions were prepared and coin-shaped batteries were fabricated as in Example 1 except that specific amounts of tin compounds shown in Table 1 were added to the nonaqueous electrolytic solutions as additives. The battery characteristics were measured as in Example 1. The results are summarized in Table 1. No change was observed in these electrolytic solutions of Examples 2 to 11 after one-month storage at 25° C.

Comparative Examples 1 to 4

Nonaqueous electrolytic solutions were prepared and coin-shaped batteries were fabricated as in Example 1 except that the tin compound of the present invention was not used. The battery characteristics were measured as in Example 1. The results are summarized in Table 1.

TABLE 1

| | | Sn compound (I) | | Sn compound (II) | | | Discharge capacity | Recovery rate |
|---|---|---|---|---|---|---|---|---|
| | | Compound | Amount added wt % | Compound | Amount added wt % | Composition of electrolytic solution (Volume ratio) | retention after 200 cycles (%) | of discharge capacity after storage (%) |
| Examples | 1 | Tributyl(trimethylsilyl)tin | 0.1 | None | 0 | EC/VC/DEC = 29/1/70 | 81 | 87 |
| | 2 | Tributyl(trimethylsilyl)tin | 0.5 | None | 0 | EC/VC/DEC = 29/1/70 | 85 | 89 |
| | 3 | Tributyl(trimethylsilyl)tin | 1 | None | 0 | EC/VC/DEC = 29/1/70 | 84 | 87 |
| | 4 | Tributyl(trimethylsilyl)tin | 0.5 | None | 0 | EC/PS/DEC = 29/1/70 | 83 | 88 |
| | 5 | Tributyl(trimethylsilyl)tin | 0.5 | None | 0 | EC/VC/DEC = 29/1/70 *3 | 88 | 91 |
| | 6 | Triphenyl(dimethylallylsilyl)tin | 0.1 | None | 0 | EC/VC/DEC = 29/1/70 | 80 | 86 |
| | 7 | Triphenyl(dimethylphenylsilyl)tin | 0.1 | None | 0 | EC/VC/DEC = 29/1/70 | 79 | 88 |
| | 8 | Trimethyl(tributylstannyl)germane | 0.5 | None | 0 | EC/VC/DEC = 29/1/70 | 84 | 90 |

TABLE 1-continued

|  |  | Sn compound (I) | | Sn compound (II) | | Composition of electrolytic solution (Volume ratio) | Discharge capacity retention after 200 cycles (%) | Recovery rate of discharge capacity after storage (%) |
|---|---|---|---|---|---|---|---|---|
|  |  | Compound | Amount added wt % | Compound | Amount added wt % |  |  |  |
|  | 9 | None | 0 | Tin (II) *1 | 0.05 | EC/VC/DEC = 29/1/70 | 75 | 78 |
|  | 10 | None | 0 | Tin (II) *2 | 0.05 | EC/VC/DEC = 29/1/70 | 73 | 75 |
|  | 11 | Tributyl(trimethylsilyl)tin | 0.5 | Tin (II) *1 | 0.05 | EC/VC/DEC = 29/1/70 *3 | 90 | 93 |
| Comparative Examples | 1 | None | 0 | None | 0 | EC/VC/DEC = 29/1/70 | 68 | 63 |
|  | 2 | None | 0 | None | 0 | EC/PS/DEC = 29/1/70 | 67 | 62 |
|  | 3 | None | 0 | None | 0 | EC/VC/DEC = 29/1/70 *4 | 67 | 65 |
|  | 4 | None | 0 | None | 0 | EC/VC/DEC = 29/1/70 *5 | 65 | 64 |

*1: Bis(hexafluoroacetylacetonate)tin(II)
*2: Bis(acetylacetonate)tin(II)
*3: Electrolyte salts 0.95 M LiPF$_6$ + 0.05 M LiBF$_4$
*4: 0.5 wt % of Dibutyltin(1-aryloxymethyl)ethylene glycolate added
*5: 0.5 wt % of Dibutyltinbis(acetylacetonate) added

Examples 12 to 24

Nonaqueous electrolytic solutions were prepared and coin-shaped batteries were fabricated as in Example 1 except that mixtures of tin compounds represented by the general formula (I) and/or (II) and tin compounds represented by the general formula (III) in predetermined ratios were used as shown in Table 2. The battery characteristics were measured as in Example 1. The results are summarized in Table 2. No change was observed in the electrolytic solutions of Examples 12 to 24 after one-month storage at 25° C.

TABLE 2

|  |  | Sn compound (I) or (II) | | Sn compound (III) | | Composition of electrolytic solution (Volume ratio) | Discharge capacity retention after 200 cycles (%) | Recovery rate of discharge capacity after storage (%) |
|---|---|---|---|---|---|---|---|---|
|  |  | Compound | Amount added wt % | Compound | Amount added wt % |  |  |  |
| Examples | 12 | Tin (II) *1 | 0.01 | Tetrabutyltin | 0.5 | EC/VC/DEC = 29/1/70 | 80 | 86 |
|  | 13 | Tin (II) *1 | 0.05 | Tetrabutyltin | 0.1 | EC/VC/DEC = 29/1/70 | 82 | 85 |
|  | 14 | Tin (II) *1 | 0.05 | Tetrabutyltin | 0.5 | EC/VC/DEC = 29/1/70 | 84 | 88 |
|  | 15 | Tin (II) *1 | 0.2 | Tetrabutyltin | 0.5 | EC/VC/DEC = 29/1/70 | 83 | 85 |
|  | 16 | Tin (II) *1 | 0.4 | Tetrabutyltin | 0.1 | EC/VC/DEC = 29/1/70 | 78 | 80 |
|  | 17 | Tin (II) *1 | 0.05 | Tetrabutyltin | 1 | EC/VC/DEC = 29/1/70 | 86 | 84 |
|  | 18 | Tin (II) *1 | 0.05 | Tetrabutyltin | 0.5 | EC/PS/DEC = 29/1/70 | 85 | 87 |
|  | 19 | Tin (II) *1 | 0.05 | Tetrabutyltin | 0.5 | EC/VC/DEC = 29/1/70 *3 | 87 | 90 |
|  | 20 | Tin (II) *1 | 0.05 | Tributyl(pentaflurophenoxy)tin | 0.5 | EC/VC/DEC = 29/1/70 *3 | 88 | 91 |
|  | 21 | Tin (II) *1 | 0.05 | Tetraallyltin | 0.1 | EC/VC/DEC = 29/1/70 | 78 | 81 |
|  | 22 | Tin (II) *1 | 0.05 | Tributylethynyltin | 0.1 | EC/VC/DEC = 29/1/70 | 77 | 80 |
|  | 23 | Tin (II) *2 | 0.05 | Tetrabutyltin | 0.5 | EC/VC/DEC = 29/1/70 | 83 | 86 |
|  | 24 | Tin *6 | 0.5 | Tetrabutyltin | 0.5 | EC/VC/DEC = 29/1/70 | 88 | 91 |

*1: Bis(hexafluoroacetylacetonate)tin (II)
*2: Bis(acetylacetonate)tin (II)
*3: Electrolyte salts 0.95 M LiPF$_6$ + 0.05 M LiBF$_4$
*6: Tributyl(trimethylsilyl)tin The lithium secondary batteries of the Examples exhibit excellent long-term cycle property and storage property in a charged state, compared to the lithium secondary batteries in the Comparative Examples not containing the tin compound of the present invention.

INDUSTRIAL APPLICABILITY

A lithium secondary battery having excellent long-term cycle property and storage property in a charged state can be produced with the nonaqueous electrolytic solution of the present invention. The resulting secondary battery may be fabricated in the form of a cylindrical battery, a square-shaped battery, a coin-shaped battery, a laminate-type battery, or any other type of battery.

The invention claimed is:

1. A nonaqueous electrolytic solution in which an electrolyte salt is dissolved in a nonaqueous solvent, comprising 0.001% to 5% by weight of a tin compound represented by the following general formula (I) and/or (II), on the basis of the weight of the nonaqueous electrolytic solution:

$$R^1R^2R^3Sn-MR^4R^5R^6 \quad (I)$$

where $R^1$, $R^2$, and $R^3$ each represent a hydrogen atom, a halogen atom, a C1 to C12 alkyl group, a C2 to C12 alkenyl group, a C2 to C12 alkynyl group, a C6 to C18 aryl group, or a C6 to C18 aryloxy group that may be substituted; $R^4$, $R^5$, and $R^6$ each represent a hydrogen atom, a halogen atom, a C1 to C12 alkyl group, a C2 to C12 alkenyl group, a C2 to C12 alkynyl group, or a C6 to C18 aryl group; M represents Si or Ge; and $R^1$ to $R^3$ and $R^4$ to $R^6$ may be the same or different from each other; and $$SnX_2 \quad (II)$$

where X represents β-diketonate.

2. The nonaqueous electrolytic solution according to claim 1, wherein the tin compound represented by the general formula (I) is at least one compound selected from the group consisting of tributyl(trimethylsilyl)tin, triphenyl(dimethylallylsilyl)tin, triphenyl(dimethylphenylsilyl)tin, trimethyl(tributylstannyl)germane, and triethyl(tributylstannyl)germane.

3. The nonaqueous electrolytic solution according to claim 1, wherein the tin compound represented by the general formula (II) is at least one compound selected from the group consisting of bis(acetylacetonate)tin and bis(hexafluoroacetylacetonate)tin.

4. The nonaqueous electrolytic solution according to claim 1, further comprising 0.001% to 5% by weight of a tin compound represented by the following general formula (III), on the basis of the weight of the nonaqueous electrolytic solution:

$$SnR^7R^8R^9R^{10} \quad (III)$$

where $R^7$ represents a hydrogen atom, a C1 to C12 alkyl group, a C2 to C12 alkenyl group, a C2 to C12 alkynyl group, a C6 to C18 aryl group, or a C6 to C18 aryloxy group; $R^8$, $R^9$, and $R^{10}$ each represent a C1 to C12 alkyl group, a C2 to C12 alkenyl group, a C2 to C12 alkynyl group, a C6 to C18 aryl group, or a C6 to C18 aryloxy group; and $R^8$ to $R^{10}$ may be the same or different from each other.

5. The nonaqueous electrolytic solution according to claim 4, wherein the tin compound represented by the general formula (III) is at least one compound selected from the group consisting of tetrabutyltin, trimethylallyltin, tributylallyltin, tributylethynyltin, dibutyldivinyltin, triphenylallyltin, and tributylpentafluorophenoxytin.

6. The nonaqueous electrolytic solution according to claim 1, wherein the nonaqueous electrolytic solution in which an electrolyte salt is dissolved in a nonaqueous solvent, comprising 0.001% to 5% by weight of a tin compound represented by the following general formula (I), on the basis of the weight of the nonaqueous electrolytic solution:

$$R^1R^2R^3Sn\text{-}MR^4R^5R^6 \quad (I)$$

where $R^1$, $R^2$, and $R^3$ each represent a hydrogen atom, a halogen atom, a C1 to C12 alkyl group, a C2 to C12 alkenyl group, a C2 to C12 alkynyl group, a C6 to C18 aryl group, or a C6 to C18 aryloxy group that may be substituted; $R^4$, $R^5$, and $R^6$ each represent a hydrogen atom, a halogen atom, a C1 to C12 alkyl group, a C2 to C12 alkenyl group, a C2 to C12 alkynyl group, or a C6 to C18 aryl group; M represents Si or Ge; and $R^1$ to $R^3$ and $R^4$ to $R^6$ may be the same or different from each other.

7. The nonaqueous electrolytic solution according to claim 1, wherein the nonaqueous electrolytic solution in which an electrolyte salt is dissolved in a nonaqueous solvent, comprising 0.001% to 5% by weight of a tin compound represented by the following general formula (II), on the basis of the weight of the nonaqueous electrolytic solution:

$$SnX_2 \quad (II)$$

where X represents β-diketonate.

8. The nonaqueous electrolytic solution according to claim 1, wherein the nonaqueous electrolytic solution has a recovery rate of discharge after storage in a range of from 75% to 93%.

9. A lithium secondary battery comprising a positive electrode, a negative electrode, and a nonaqueous electrolytic solution in which an electrolyte salt is dissolved in a nonaqueous solvent, wherein the nonaqueous electrolytic solution is the nonaqueous electrolytic solution according to claim 1.

* * * * *